(12) United States Patent
Okahashi et al.

(10) Patent No.: US 12,724,300 B2
(45) Date of Patent: Sep. 1, 2026

(54) OPTICAL WAVEGUIDE DEVICE, AND OPTICAL MODULATION DEVICE AND OPTICAL TRANSMISSION APPARATUS USING SAME

(71) Applicant: SUMITOMO OSAKA CEMENT CO., LTD., Tokyo (JP)

(72) Inventors: Kosuke Okahashi, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 18/564,548

(22) PCT Filed: Sep. 30, 2022

(86) PCT No.: PCT/JP2022/036752

§ 371 (c)(1),
(2) Date: Nov. 27, 2023

(87) PCT Pub. No.: WO2024/069952

PCT Pub. Date: Apr. 4, 2024

(65) Prior Publication Data

US 2025/0231434 A1 Jul. 17, 2025

(51) Int. Cl.
*G02F 1/035* (2006.01)
*G02F 1/03* (2006.01)

(52) U.S. Cl.
CPC ............ *G02F 1/035* (2013.01); *G02F 1/0316* (2013.01); *G02F 1/0356* (2013.01); *G02F 2202/20* (2013.01)

(58) Field of Classification Search
CPC .......... G02F 1/03; G02F 1/0316; G02F 1/035; G02F 1/0356; G02F 2202/20
See application file for complete search history.

(56) References Cited

U.S. PATENT DOCUMENTS 4,807,952 A 2/1989 Jaeger
7,426,326 B2 * 9/2008 Moeller ................ G02F 1/0356 385/9
2015/0147038 A1 * 5/2015 Asai ....................... G02B 6/122 385/122
2020/0271963 A1 8/2020 Iwatsuka
(Continued)

FOREIGN PATENT DOCUMENTS

JP H09-185025 A 7/1997
JP 2007-272122 A 10/2007
(Continued)

*Primary Examiner* — Daniel Petkovsek
(74) *Attorney, Agent, or Firm* — IPHORGAN LTD.

(57) ABSTRACT

An object of the present invention is to provide an optical waveguide device that suppresses optical absorption even in a case where an electrode clearance is narrow. An optical waveguide device of the present invention includes a substrate 1 on which an optical waveguide 10 is formed, and a control electrode 3 disposed close to the optical waveguide on the substrate, in which the optical waveguide 10 is a protruding optical waveguide, and a shape of a side surface of the control electrode 3 facing the optical waveguide includes an inclined surface 32 having a predetermined angle from the substrate and a curved surface 33 that is contiguous to the inclined surface and that forms a curved recess.

6 Claims, 7 Drawing Sheets

(56) References Cited

U.S. PATENT DOCUMENTS

2021/0199997 A1* 7/2021 Okahashi ................ G02F 1/225
2024/0210784 A1* 6/2024 Hayami .................. G02F 1/212

FOREIGN PATENT DOCUMENTS

JP 2011-215294 A 10/2011
JP 2015-099385 A 5/2015
JP 2020-134874 A 8/2020

* cited by examiner

OPTICAL WAVEGUIDE DEVICE, AND OPTICAL MODULATION DEVICE AND OPTICAL TRANSMISSION APPARATUS USING SAME

CROSS REFERENCE TO RELATED APPLICATIONS

This application is a national stage completion application of PCT Application No. PCT/JP2022/036752, filed Sep. 30, 2022. The application is incorporated by reference herein in its entirety.

TECHNICAL FIELD

The present invention relates to an optical waveguide device, and an optical modulation device and an optical transmission apparatus using the same, and particularly to an optical waveguide device including a substrate on which an optical waveguide is formed, and a control electrode disposed close to the optical waveguide on the substrate, and an optical modulation device and an optical transmission apparatus using the same.

BACKGROUND ART

In the field of optical measurement technology or in the field of optical communication technology, optical waveguide devices such as an optical modulator using a substrate on which an optical waveguide is formed have been widely used. In a general optical waveguide device, an optical waveguide is formed on a substrate of lithium niobate (LN) or the like having an electro-optic effect, and a control electrode that applies an electric field to the optical waveguide is formed on the substrate.

In Patent Literature No. 1, as illustrated in FIG. 1, by configuring a control electrode 3 to have a two-stage structure and by forming an electrode 30 in the first stage to be thin, it is possible to accurately create the control electrode even in a case where an electrode clearance is narrowed, and it is possible to decrease a drive voltage. In addition, by forming an electrode 31 in the second stage to be thick in the form of an inverted trapezoid, it is possible to prevent deterioration in a high-frequency characteristic. Reference sign 1 denotes the substrate, reference sign 2 denotes the optical waveguide, and reference sign 4 denotes a buffer layer.

In Patent Literature No. 2, as illustrated in FIG. 2, forming the control electrode 3 to have a trapezoidal cross section by inclining side surfaces of the control electrode 3 is disclosed. This configuration can suppress an increase in the drive voltage, improve the high-frequency characteristic, and furthermore, suppress a manufacturing cost.

In recent years, high bandwidth-coherent driver modulators (HB-CDM) have drawn attention. The optical waveguide formed on the substrate has a width and a height of approximately 1 μm and uses a protruding optical waveguide (for example, a rib type waveguide, a ridge type waveguide, or a slot type waveguide) including a protruding portion extending in a band shape. Such a micro protruding waveguide has strong confinement of light, and the optical waveguide can be bent with a small curvature. Thus, it is possible to form a compact optical waveguide device.

However, a clearance of the control electrode, for example, a clearance between a signal electrode and a ground electrode or a clearance between DC bias electrodes, is reduced from several tens of μm in the related art to several μm, and the electrode clearance is significantly narrow. Thus, since the electrode is likely to absorb a light wave propagating through the optical waveguide, a problem arises in that a propagation loss (optical absorption loss) of the light wave is increased.

In addition, in a case where the electrode structure in Patent Literature No. 1 is employed, adjacent electrodes are excessively close to each other in an upper portion (second stage). Thus, it is difficult to employ such a structure. In addition, providing the inclined surfaces in Patent Literature No. 2 results in a state where the protruding optical waveguide is close to the inclined surfaces of the electrode. Thus, it is difficult to effectively suppress optical absorption caused by the electrode.

CITATION LIST

Patent Literature

[Patent Literature No. 1] Japanese Laid-open Patent Publication No. H09-185025 (JP1997-185025A)

[Patent Literature No. 2] Japanese Laid-open Patent Publication No. 2011-215294 (JP2011-215294A)

SUMMARY OF INVENTION

Technical Problem

An object to be solved by the present invention is to solve the above problem and to provide an optical waveguide device that suppresses optical absorption even in a case where an electrode clearance is narrow. Furthermore, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes a substrate on which an optical waveguide is formed, and a control electrode disposed close to the optical waveguide on the substrate, in which the optical waveguide is a protruding optical waveguide, and a shape of a side surface of the control electrode facing the optical waveguide includes an inclined surface having a predetermined angle with the substrate and a curved surface that is contiguous to the inclined surface and that forms a curved recess.

(2) In the optical waveguide device according to (1), a position that changes from the inclined surface to the curved surface is provided at a position lower than a height of the optical waveguide.

(3) In the optical waveguide device according to (1), a thickness of the electrode is 1 μm or less.

(4) An optical modulation device includes the optical waveguide device according to any one of (1) to (3), a case accommodating the optical waveguide device, and an optical fiber through which a light wave is input into the optical waveguide or output from the optical waveguide.

(5) In the optical modulation device according to (4), the control electrode is a modulation electrode for modulating the light wave propagating through the optical waveguide, and an electronic circuit that amplifies a modulation signal to be input into the modulation electrode is provided inside the case.

(6) An optical transmission apparatus includes the optical modulation device according to (5), a light source that inputs a light wave into the optical modulation device, and an electronic circuit that outputs a modulation signal to the optical modulation device.

Advantageous Effects of Invention

In the present invention, an optical waveguide device includes a substrate on which an optical waveguide is formed, and a control electrode disposed close to the optical waveguide on the substrate, in which the optical waveguide is a protruding optical waveguide, and a shape of a side surface of the control electrode facing the optical waveguide includes an inclined surface having a predetermined angle with the substrate and a curved surface that is contiguous to the inclined surface and that forms a curved recess. Thus, since a distance between the protruding optical waveguide and the control electrode, particularly a distance between both in an upper portion of the control electrode, can be increased, optical absorption caused by the control electrode can be suppressed.

Furthermore, the optical waveguide device having such advantageous characteristics can also be used to provide the optical modulation device and the optical transmission apparatus that achieve the same effect.

DESCRIPTION OF EMBODIMENTS

Hereinafter, an optical waveguide device of the present invention will be described in detail using preferred examples.

Figure 3:
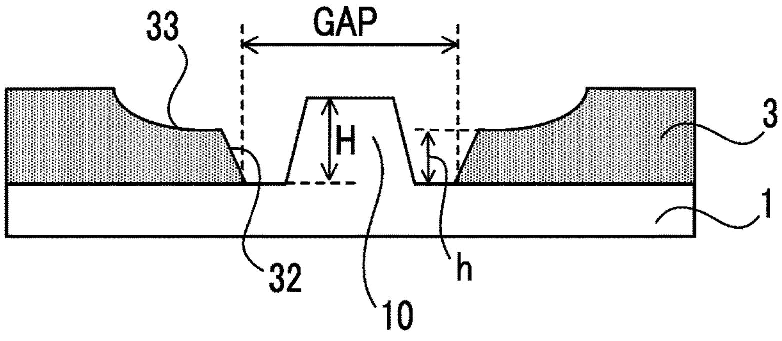
FIG. 3 is a cross section view illustrating an example of an optical waveguide device of the present invention.

A cross section view illustrating an example of the optical waveguide device of the present invention is illustrated in FIG. 3.

The optical waveguide device of the present invention includes a substrate 1 on which an optical waveguide 10 is formed, and a control electrode 3 disposed close to the optical waveguide on the substrate, in which the optical waveguide 10 is a protruding optical waveguide, and a shape of a side surface of the control electrode 3 facing the optical waveguide includes an inclined surface 32 having a predetermined angle from the substrate and a curved surface 33 that is contiguous to the inclined surface and that forms a curved recess.

As the substrate 1 used in the optical waveguide device of the present invention, a substrate having an electro-optic effect can be used. Specifically, substrates of lithium niobate (LN), lithium tantalate (LT), lead lanthanum zirconate titanate (PLZT), and the like or base materials obtained by doping these substrate materials with MgO or the like can be used. In addition, these materials can be formed into films using a vapor-phase growth method such as a sputtering method, a vapor deposition method, or a CVD method. Furthermore, semiconductor substrates and the like can be used.

As a method of forming the optical waveguide 10, a protruding optical waveguide obtained by forming a part corresponding to the optical waveguide on the substrate as a protruding portion by, for example, etching the substrate 1 other than the optical waveguide or by forming grooves on both sides of the optical waveguide can be used. In addition, a slot type waveguide obtained by removing the entire part other than the optical waveguide using a method such as etching can be used. Furthermore, a refractive index can be further increased by diffusing Ti or the like on a surface of the substrate using a thermal diffusion method, a proton exchange method, or the like in accordance with the protruding optical waveguide. The protruding optical waveguide is a micro protruding optical waveguide having a width and a height of approximately 1 μm as a size in order to increase confinement of light.

A thickness of the substrate (thin plate) 1 on which the optical waveguide 10 is formed is set to be 10 μm or less, more preferably 5 μm or less, and still more preferably 1 μm or less in order to achieve velocity matching between a microwave of a modulation signal and a light wave. In addition, a height of the protruding optical waveguide is set to be 4 μm or less, more preferably 3 μm or less, and still more preferably 1 μm or less or 0.4 μm or less.

In the substrate 1 on which the optical waveguide is formed, a reinforcing substrate (not illustrated) is joined to a lower side of the substrate 1 in order to increase mechanical strength. The substrate 1 and the reinforcing substrate are adhesively fixed via direct joining or through an adhesive layer of resin or the like. In a case of direct joining, an intermediate layer of metal oxide, metal, or the like may be provided. The reinforcing substrate to be directly joined preferably has, but not limited to, a lower refractive index than the optical waveguide or than the substrate on which the optical waveguide is formed. In addition, a substrate including a material, for example, an oxide layer of crystal or of glass, having a similar coefficient of thermal expansion to the substrate 1 is preferably used as the reinforcing substrate. Furthermore, the same LN substrate as the substrate 1, or a composite substrate obtained by forming a silicon oxide layer on a silicon substrate and a composite substrate obtained by forming a silicon oxide layer on an LN substrate, which are abbreviated to SOI and LNOI, can also be used.

The control electrode 3 is formed close to the optical waveguide 10 on the substrate 1. The control electrode includes a modulation electrode that applies a modulation signal to the optical waveguide, and a DC bias electrode that applies a DC bias voltage to the optical waveguide. The control electrode is formed as a thick electrode by forming a base electrode using the sputtering method, the vapor deposition method, or the like and then using a plating method.

In the present invention, the shape of the side surface of the control electrode 3 facing the optical waveguide 10 includes the inclined surface 32 having the predetermined angle with the substrate and the curved surface 33 that is contiguous to the inclined surface 32 and that forms the curved recess.

Figure 4:
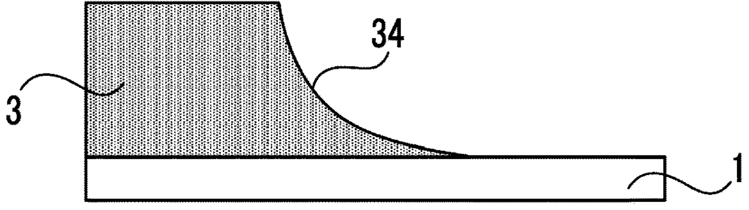
FIG. 4 is a diagram illustrating an example of a case where the entire side surface of a control electrode is formed with a curve that forms a curved recess.

As a method of separating the side surface of the control electrode from the optical waveguide, forming the entire side surface of the control electrode with a curved surface 34 that forms a curved recess as illustrated in FIG. 4 is considered. However, in such an electrode shape, the electrode close to the optical waveguide (the electrode in a lower portion of the curved surface 34) is thin, and it is difficult to effectively apply the electric field to the optical waveguide. In addition, a problem arises in that the electrode in the lower portion of the curved surface 34 has a significantly small thickness and easily peels from the substrate 1.

Figure 5:
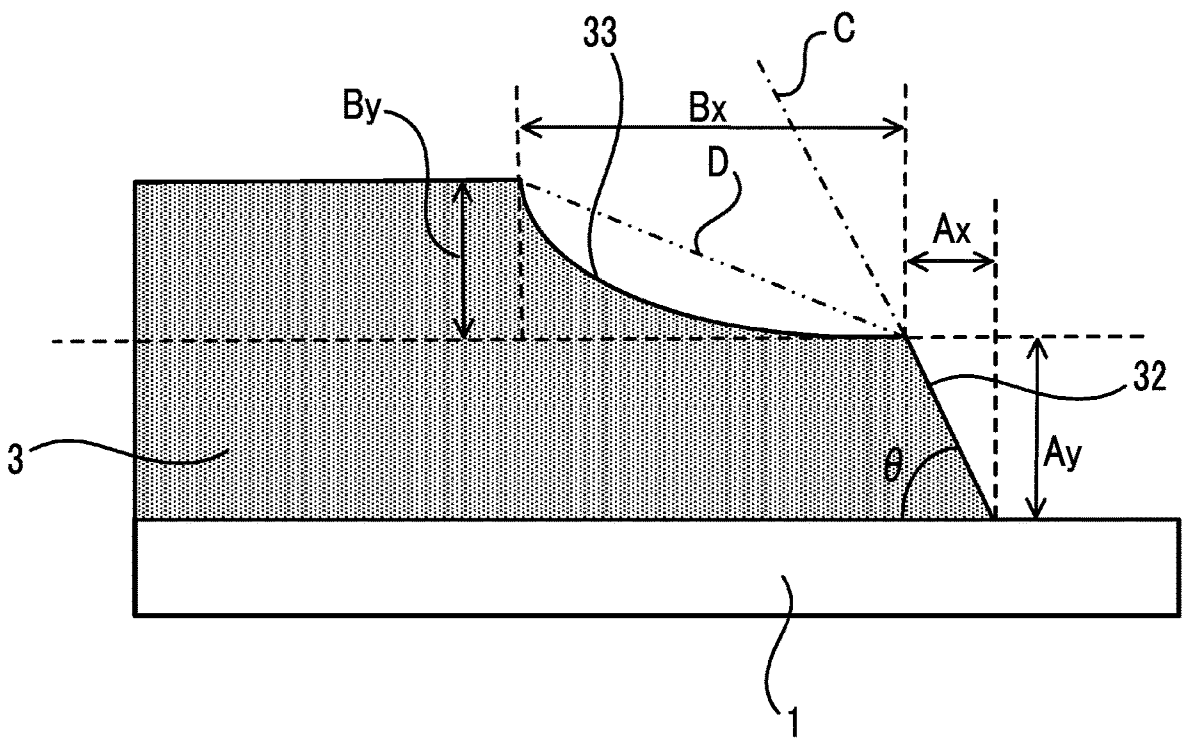
FIG. 5 is a diagram for describing a shape of the control electrode used in the optical waveguide device of the present invention.

Thus, as illustrated in FIG. 5, a lower portion of the control electrode 3 is formed as the inclined surface 32 having a predetermined angle θ with the substrate 1. Considering application efficiency of the electric field (VII) and a close contact of the electrode (prevention of the electrode from peeling), a height Ay of the inclined surface 32 in FIG. 5 is 10 nm or higher and more preferably 100 nm or higher. In addition, the angle θ is set to 30 degrees≤θ≤90 degrees. Considering the close contact between the electrode and the substrate, the angle θ is preferably 30 degrees or higher. Furthermore, in a case where the electrode is formed with the angle θ that exceeds 90 degrees, the electrode comes close to the optical waveguide, and optical absorption caused by the electrode occurs. Thus, the angle θ is preferably 90 degrees or lower.

As illustrated in FIG. 3, a height h of a position that changes from the inclined surface 32 to the curved surface 33 is provided at a position lower than a height H of the optical waveguide 10. The curved surface 33 of the present invention effectively functions in a case where the inclined surface 32 extends higher than the height H of the optical waveguide and causes the light wave spreading from the optical waveguide 10, particularly the light wave on a higher optical mode diameter side, to be absorbed by the inclined surface. The curved surface 33 of the present invention increases a distance between the optical waveguide 10 and the control electrode and suppresses absorption of the light wave.

Considering an optical band (high-frequency characteristic), a total of Ay (the height of the inclined surface) and By (a height of the curved surface) in FIG. 5 is preferably 200 nm or higher. Of course, a top portion of the curved surface 33 is higher than the height H of the optical waveguide as illustrated in FIG. 3.

Considering a manufacturing process such as lift-off, described later, a thickness (Ay+By) of the control electrode 3 is preferably 1000 nm or less as a range in which the control electrode 3 can be stably formed.

A length (Ax+Bx) from a position of the control electrode 3 close to the optical waveguide 10 to the top portion of the curved surface 33 is preferably 100 nm or higher and more preferably 200 nm or higher in order to reduce a loss caused by absorption by the electrode. Ax is a length of the inclined surface in a horizontal direction (a right-left direction in the drawing), and Bx is a length of the curved surface in the horizontal direction.

The "curved surface forming the curved recess" used in the present invention means that a surface of the curved surface 33 is recessed to an electrode side from double-dot-dashed line D connecting both ends of the curved surface as illustrated in FIG. 5. In addition, a position at which the curved surface 33 is disposed is disposed to be separated to the electrode side from dot-dashed line C that is a line extending from the inclined surface 32.

FIGS. 6A to 6D are diagrams for describing a process of forming the control electrode.

Figure 6A:
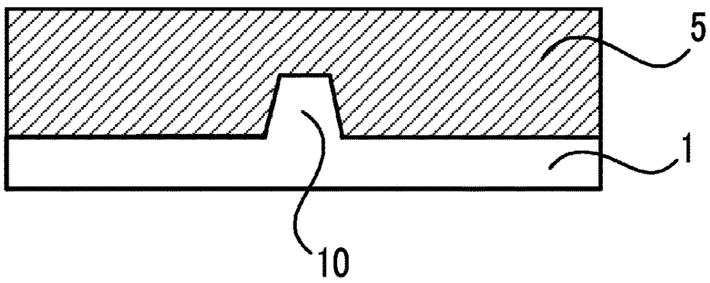
FIGS. 6A to 6D are diagrams for describing a manufacturing method of the optical waveguide device illustrated in FIG. 3.
Figure 6B:
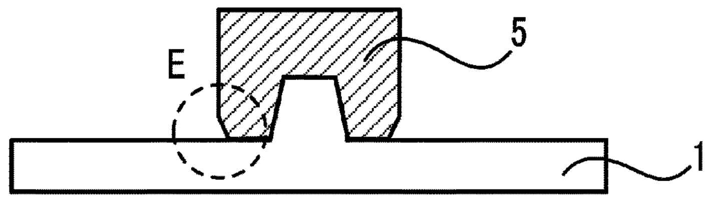

FIG. 6A is a state where a resist film 5 is applied onto the substrate 1 on which the optical waveguide 10 is formed. The resist film is processed into the shape illustrated in FIG. 6B by exposing the resist film to light using UV, a laser, an electron beam, or the like to be removed during development. Particularly, a state (refer to dotted line frame E) where the resist film 5 has an undercut near a part of contact between the resist film 5 and the substrate 1 is preferable.

Figure 6C:
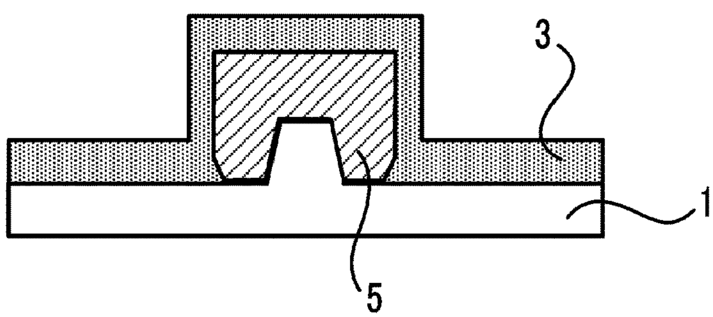
Figure 6D:
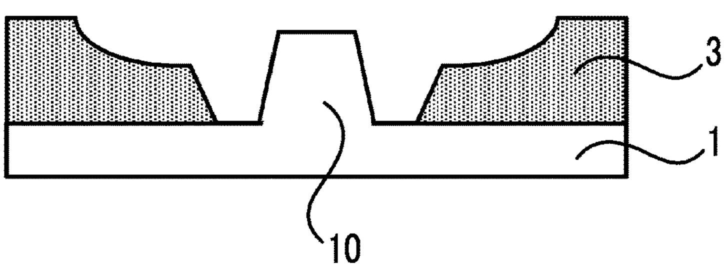

In FIG. 6C, the surface of the substrate 1 including the resist film 5 is laminated with a material of the electrode 3 using the vapor deposition method, the plating method, the sputtering method, the CVD method, or the like. Next, the electrode structure illustrated in FIG. 6D is formed by performing lift-off on the resist film 5. FIGS. 6A to 6D illustrate a part near the protruding optical waveguide 10 in an enlarged manner.

Figure 7:
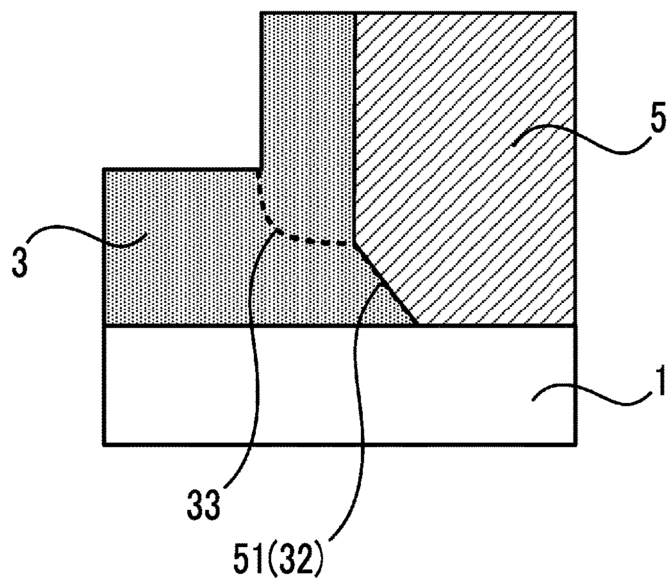
FIG. 7 is a diagram for describing a state before performing lift-off during the manufacturing method in FIG. 6.

FIG. 7 is an enlarged view near a lower portion of the resist film 5 before performing lift-off. In a case where lift-off is performed on the resist film 5, the inclined surface 32 is formed on an undercut surface 51 of the resist film, and a recess (curved surface 33) along a dotted line is formed between the resist film 5 and a corner portion of the electrode 3.

Figure 1:
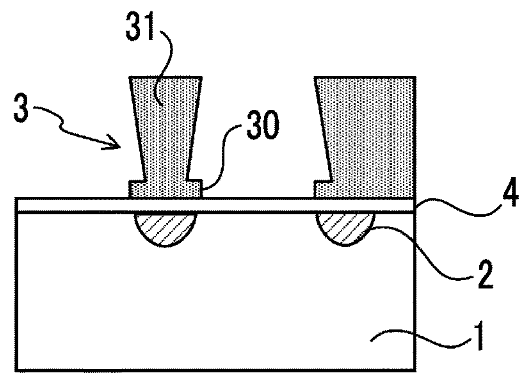
FIG. 1 is a cross section view illustrating an example of an optical waveguide device in the related art.
Figure 2:
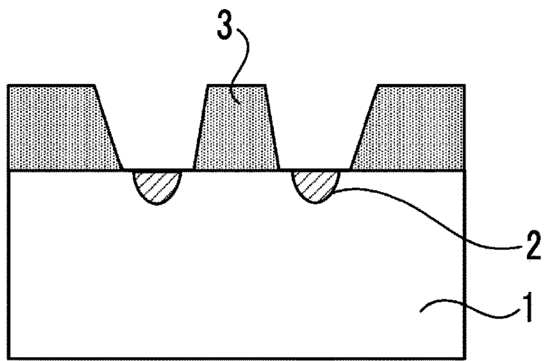
FIG. 2 is a cross section view illustrating another example of the optical waveguide device in the related art.
Figure 8:
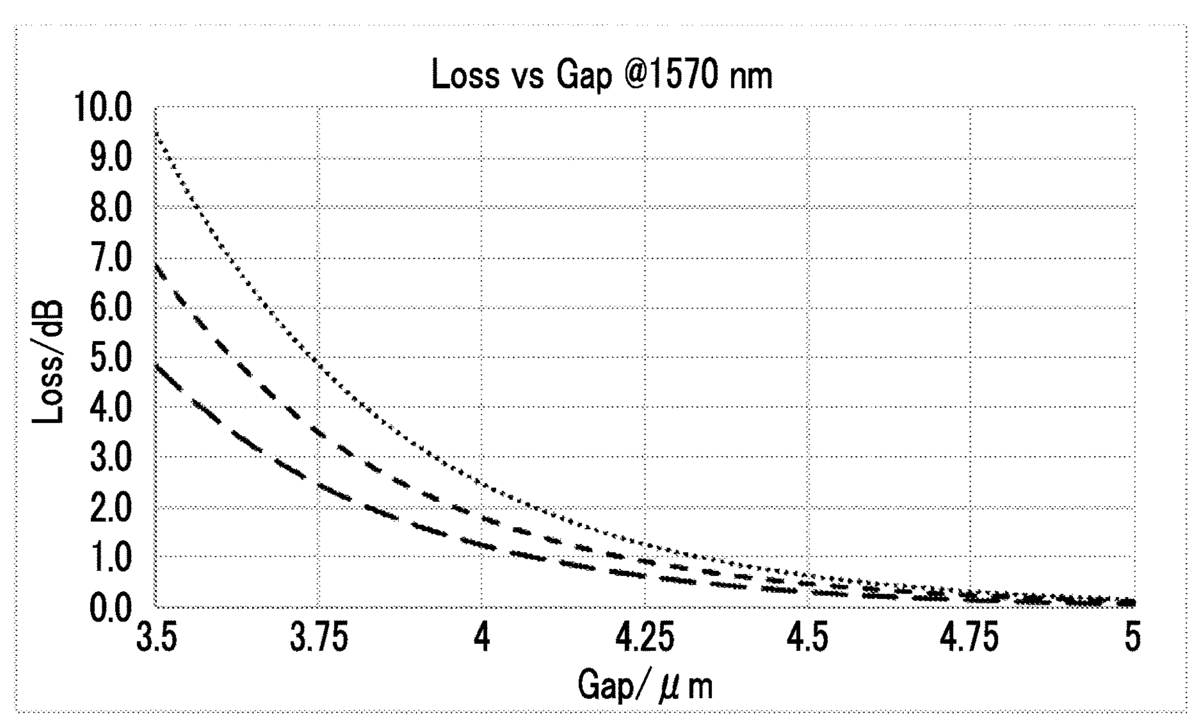
FIG. 8 is a diagram for describing a change in an optical absorption loss caused by a shape of the side surface of the control electrode.

In order to evaluate an effect of the shape of the side surface of the control electrode of the present invention, an optical absorption loss (Loss, dB) is simulated using shapes of the side surface that have only a rectangular shape, a trapezoidal shape (only inclination) in FIG. 2, and furthermore, a combination of the inclined surface and the curved surface as in the present invention. The graph in FIG. 8 is a result of evaluating the optical absorption loss by changing a clearance GAP between control electrodes illustrated in FIG. 3 within a range of 3.5 μm to 5.0 μm. A wavelength of the light wave that is used is 1570 nm. In FIG. 8, the graph positioned in the uppermost portion means the electrode having the rectangular shape, the graph positioned in the intermediate portion means the electrode having the trapezoidal shape, and the graph positioned in the lowermost portion means the electrode having the shape of the present invention.

It can be understood that there is almost no effect of a change in the shape of the side surface of the electrode in a case where the electrode clearance GAP is 5 μm or higher. However, as the electrode clearance GAP is narrowed, particularly 4 μm or less, the effect of the shape of the side surface of the electrode is remarkable, and it is understood that the shape of the electrode of the present invention effectively suppresses the optical absorption loss.

Figure 9:
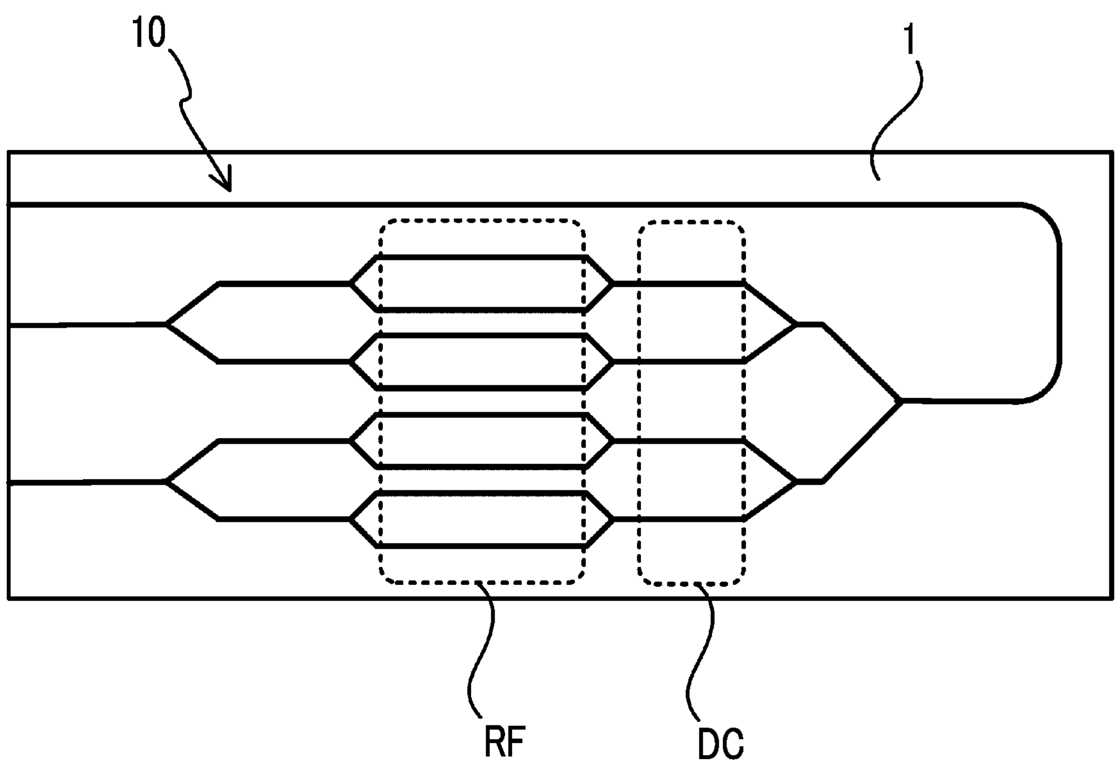
FIG. 9 is a diagram illustrating an example of an optical waveguide device used in HB-CDM.
Figure 10A:
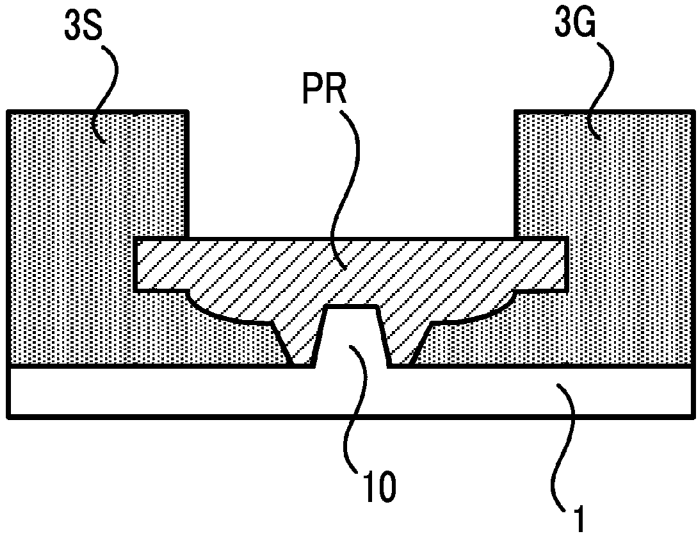
FIGS. 10A and 10B illustrate a cross section view in a modulation electrode RF and a cross section view in a DC bias electrode in FIG. 9.
Figure 10B:
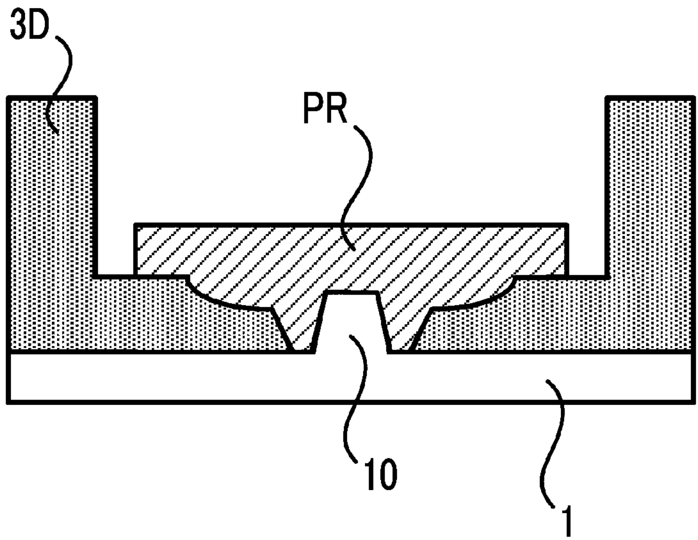

FIG. 9 is a plan view of the substrate 1 illustrating an example of an optical waveguide device used in HB-CDM or the like. In the optical waveguide 10, two nest type optical waveguides each incorporating a plurality of Mach-Zehnder type optical waveguides in a nested manner are disposed parallel to each other. In such a complicated optical waveguide, the width and the height of the optical waveguide are significantly small. In addition, the thickness of the electrode is also small. Thus, in a region (reference sign RF) in which the modulation electrode is formed, or in a region (reference sign DC) in which the DC bias electrode is formed, a configuration referred to as a "permanent resist" (PR) using a resin material or an inorganic dielectric material as illustrated in FIGS. 10A and 10B can be employed. As an example of the resin material, materials such as polyamide-based resin, melamine-based resin, phenol-based resin, amino-based resin, and epoxy-based resin can be used. As an example of the inorganic dielectric material, for example, $SiO_2$, $Al_2O_3$, MgF, $La_2O_3$, Zno, MgO, $CaF_2$, and $Y_2O_3$ can be used.

FIG. 10A is an example of a cross section view illustrating the modulation electrode in the region RF. In lower portions of a signal electrode 3S and a ground electrode 3G, the shape of the control electrode of the present invention is employed, and the permanent resist PR is disposed to cover a part of the control electrode and the optical waveguide 10. The permanent resist suppresses scattering caused by roughness of a surface of the optical waveguide and prevents the electrode from peeling from the substrate. In addition, by disposing the electrode (3S, 3G) to cover a part of the permanent resist PR, it is possible to not only improve the high-frequency characteristic of the modulation electrode but also suppress peeling of the permanent resist.

In FIG. 10B, the electrode is not disposed to cover the permanent resist PR because upper portions of the DC bias electrodes (3D) are not required to be close to each other. The permanent resist related to the optical waveguide 10 and to the lower portion of the electrode has the effect described above.

Next, examples of applying the optical waveguide device of the present invention to an optical modulation device and to an optical transmission apparatus will be described. While an example of HB-CDM will be used in the following description, the present invention is not limited to the example and can also be applied to an optical phase modulator, an optical modulator having a polarization combining function, an optical waveguide device in which a larger or smaller number of Mach-Zehnder type optical waveguides are integrated, a device joined to an optical waveguide device including other materials such as silicon, a device used as a sensor, and the like.

Figure 11:
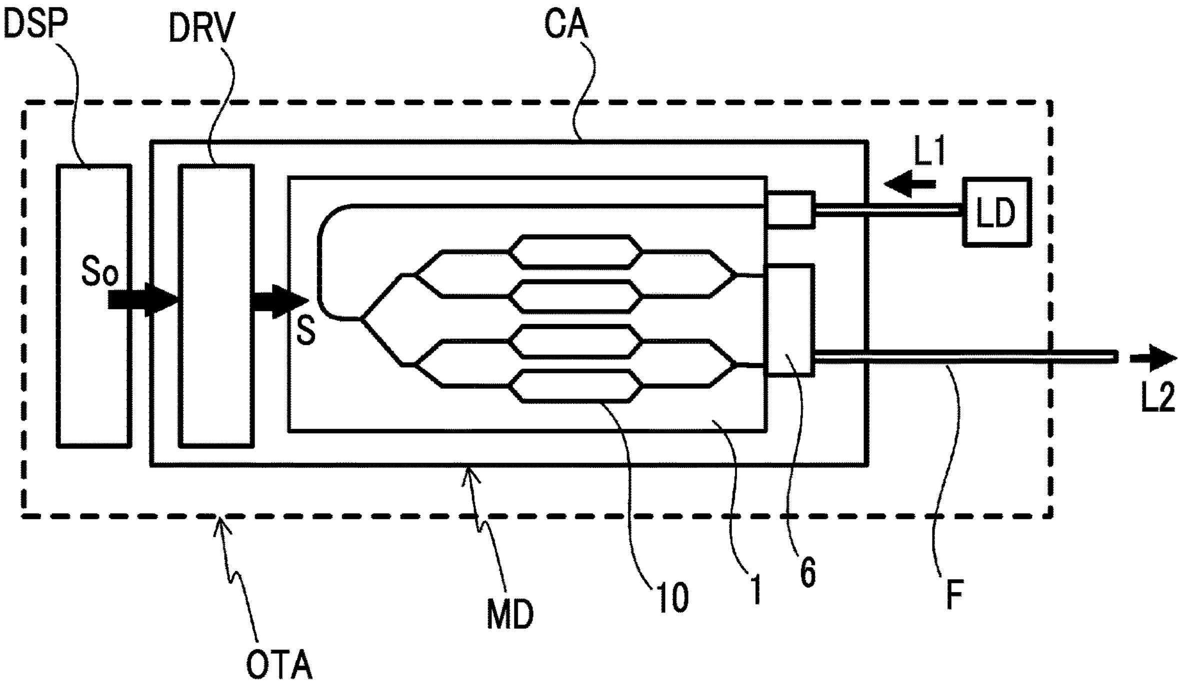
FIG. 11 is a diagram illustrating an example of an optical transmission apparatus of the present invention.

As illustrated in FIG. 11, the optical waveguide device includes the optical waveguide 10 formed on the optical waveguide substrate 1, and the control electrode (not illustrated) such as the modulation electrode that modulates the light wave propagating through the optical waveguide 10. The optical waveguide device is accommodated inside a case CA. Furthermore, an optical modulation device MD can be configured by providing an optical fiber (F) through which the light wave is input into the optical waveguide or output from the optical waveguide. In FIG. 11, the optical fiber F is optically coupled to the optical waveguide 10 inside the optical waveguide device using an optical block including an optical lens, a lens barrel, a polarization combining unit 6, and the like. The present invention is not limited to the optical fiber F in FIG. 7. The optical fiber may be introduced into the case through a through-hole that penetrates through a side wall of the case. The optical fiber may be directly joined to an optical component or to the substrate, or the optical fiber having a lens function in an end portion of the optical fiber may be optically coupled to the optical waveguide inside the optical waveguide device. In addition, a reinforcing member (not illustrated) can be disposed to overlap along an end surface of the optical waveguide substrate 1 in order to stably join the optical fiber to the optical block.

An optical transmission apparatus OTA can be configured by connecting, to the optical modulation device MD, an electronic circuit (digital signal processor DSP) that outputs a modulation signal So causing the optical modulation device MD to perform a modulation operation. In order to obtain a modulation signal S to be applied to the optical waveguide device, it is required to amplify the modulation signal So output from the digital signal processor DSP. Thus, in FIG. 11, the modulation signal is amplified using a driver circuit DRV. The driver circuit DRV and the digital signal processor DSP can be disposed outside the case CA or can be disposed inside the case CA. Particularly, disposing the driver circuit DRV inside the case can further reduce the propagation loss of the modulation signal from the driver circuit.

While input light L1 of the optical modulation device MD may be supplied from an outside of the optical transmission apparatus OTA, a semiconductor laser (LD) can also be used as a light source as illustrated in FIG. 11. Output light L2 modulated by the optical modulation device MD is output to the outside through the optical fiber F.

INDUSTRIAL APPLICABILITY

As described above, according to the present invention, it is possible to provide an optical waveguide device that suppresses optical absorption even in a case where an electrode clearance is narrow. Furthermore, it is possible to provide an optical modulation device and an optical transmission apparatus using the optical waveguide device.

REFERENCE SIGNS LIST

- 1: substrate (thin plate, film body) on which optical waveguide is formed
- 3: control electrode
- 10: optical waveguide
- 32: inclined surface
- 33: curved surface
- F: optical fiber
- LD: light source
- CA: case
- MD: optical modulation device
- DRV: driver circuit
- DSP: digital signal processor
- OTA: optical transmission apparatus

The invention claimed is:

1. An optical waveguide device comprising:

a substrate on which an optical waveguide is formed; and control electrodes for modulating the light wave propagating through the optical waveguide which is disposed on the substrate, wherein the optical waveguide is a protruding optical waveguide, the control electrodes are not in contact with the protruding optical waveguide, a shape of a side surface of each of the control electrodes facing the protruding optical waveguide includes an inclined surface having a predetermined angle with the substrate and a curved surface that is contiguous to the inclined surface and that forms a curved recess, a position that changes from the inclined surface to the curved surface is provided at a position lower than a height of the protruding optical waveguide, and a top portion of the curved surface is higher than the height of the protruding optical waveguide.

2. The optical waveguide device according to claim 1, wherein two of the control electrodes are arranged to sandwich the protruding optical waveguide, and the electrode clearance of the two control electrodes is 4 μm or less.

3. The optical waveguide device according to claim 1, wherein a thickness of the control electrodes at the top of the curved surface is 1 μm or less.

4. An optical modulation device comprising:

the optical waveguide device according to claim 1;

a case accommodating the optical waveguide device; and an optical fiber through which a light wave is input into the optical waveguide or output from the optical waveguide.

5. The optical modulation device according to claim 4, wherein an electronic circuit that amplifies a modulation signal to be input into the control electrodes is provided inside the case.

6. An optical transmission apparatus comprising:

the optical modulation device according to claim 5;

a light source that inputs a light wave into the optical modulation device; and an electronic circuit that outputs a modulation signal to the optical modulation device.

* * * * *